United States Patent
Long et al.

(10) Patent No.: US 8,947,392 B2
(45) Date of Patent: Feb. 3, 2015

(54) MULTI-DRIVER TOUCH PANEL

(75) Inventors: Ding Hua Long, Shenzhen (CN); Hong Xin Mo, Shenzhen (CN)

(73) Assignee: Multek Display (Hong Kong) Limited, New Terrorities (HK)

(*) Notice: Subject to any disclaimer, the term of this patent is extended or adjusted under 35 U.S.C. 154(b) by 636 days.

(21) Appl. No.: 12/928,452

(22) Filed: Dec. 10, 2010

(65) Prior Publication Data

US 2011/0181543 A1    Jul. 28, 2011

Related U.S. Application Data

(60) Provisional application No. 61/285,849, filed on Dec. 11, 2009.

(51) Int. Cl.
*G06F 3/045* (2006.01)
*G06F 3/044* (2006.01)

(52) U.S. Cl.
CPC ..................... *G06F 3/044* (2013.01)
USPC ...... 345/174; 345/204; 178/18.06; 178/20.01

(58) Field of Classification Search
CPC ..................................... G06F 3/044
USPC ............ 345/156–183, 204; 178/18.01–18.11, 178/20.01, 20.03
See application file for complete search history.

(56) References Cited

U.S. PATENT DOCUMENTS

2004/0251917 A1*  12/2004  Blanchard ..................... 324/661
2006/0097991 A1*  5/2006  Hotelling et al. ............. 345/173
2007/0062739 A1*  3/2007  Philipp et al. ............. 178/18.06
2008/0007534 A1   1/2008  Peng et al.
2008/0036473 A1   2/2008  Jansson
2008/0142352 A1   6/2008  Wright
2008/0158169 A1*  7/2008  O'Connor et al. ........... 345/173
2008/0158178 A1*  7/2008  Hotelling et al. ............. 345/173
2008/0158183 A1   7/2008  Hotelling et al.
2008/0278178 A1   11/2008 Philipp
2009/0002338 A1   1/2009  Kinoshita et al.
2009/0066669 A1   3/2009  Olson (Continued)

OTHER PUBLICATIONS

PCT Application No. PCT/US2010/003153, International Search Report and Written Opinion dated Feb. 17, 2011.

(Continued)

*Primary Examiner* — Priyank Shah
(74) *Attorney, Agent, or Firm* — Sheridan Ross P.C.

(57) ABSTRACT

A novel capacitive touch system includes a first controller having a plurality of channels, a first sensor row having a first discrete sensor element and a second discrete sensor element, a second sensor row having a first discrete sensor element and a second discrete sensor element, a first sensor column, a second sensor column, and a first signal line electrically coupling one of the plurality of channels of the controller to both the first and second discrete sensor elements of the first sensor row. In a particular embodiment, the first controller includes a second channel electrically connected to both the first and second discrete sensor elements of the second sensor row. In another particular embodiment, the capacitive touch system includes a second controller having a plurality of channels, the first sensor column includes a first discrete sensor element and a second discrete sensor element, and a first channel of the second controller is electrically coupled to both the first and second discrete sensor elements of the first sensor column.

24 Claims, 7 Drawing Sheets

(56) References Cited

U.S. PATENT DOCUMENTS

| | | | |
|---|---|---|---|
| 2009/0085891 A1* | 4/2009 | Yang et al. | 345/174 |
| 2009/0140987 A1* | 6/2009 | Yang | 345/173 |
| 2009/0267903 A1* | 10/2009 | Cady et al. | 345/173 |
| 2010/0156811 A1* | 6/2010 | Long et al. | 345/173 |

OTHER PUBLICATIONS

International Preliminary Report on Patentability for International (PCT) Patent Application No. PCT/US2010/003153, mailed Jun. 21, 2012 9 pages.

* cited by examiner

MULTI-DRIVER TOUCH PANEL

RELATED APPLICATIONS

This application claims the benefit of priority to co-pending U.S. Provisional Patent Application Ser. No. 61/285,849, filed Dec. 11, 2009 by the same inventors and entitled "Multi-Driver Touch Panel," which is incorporated by reference herein in its entirety.

BACKGROUND OF THE INVENTION

1. Field of the Invention

This invention relates generally to touchscreen devices, and more particularly to capacitive touch systems.

2. Description of the Background Art

Currently, touchscreens are being used in embedded systems such as Smartphones, MP3 players, tablet computers, navigation systems, automatic teller machines (ATMs), and others. Traditionally, touchscreens were extremely expensive to manufacture and, therefore, impractical for most applications. However, more cost effective manufacturing processes have since been developed and touchscreen technology is rapidly gaining popularity in the electronics industry. Indeed, many conventional human-computer interface (HCI) input devices (e.g., keypads/keyboards, mechanical buttons, dials, etc.) are being replaced with touchscreens. Therefore, it is expected that the use of touchscreens in embedded applications will continue to increase for the foreseeable future.

A touchscreen system typically includes a transparent touch-sensor panel used in conjunction with an underlying graphical display device (e.g., liquid crystal display). The touch-sensor panel receives user inputs by detecting the location of a target object such as, for example, a finger, stylus, etc. The display device projects graphical output images directly through the touch-sensor panel such that human-computer interaction takes place at the touch surface of the touch-sensor panel.

One type of touch-sensor panel, the resistive touch panel, is used in many electronic devices today. A resistive touch panel is composed of two conductive layers, one of which deforms under pressure when it is touched by a target object. When the deformable conductive layer contacts the underlying conductive layer, a change in resistance between the layers is generated. A controller uses this change in resistance to determine the location of the touch.

Although resistive touch panels are still widely used, the overall design has several problems. For example, the deformable conductive layer has to be constructed from an extremely soft material in order to flex under low pressure. Consequently, the deformable layer can be punctured very easily, or damaged by abrasive or caustic cleaners. Moreover, the deformable layer can eventually fatigue over time and become "stretched" resulting in loss of touch sensitivity. As another example, resistive touch panels typically have poor optical quality because of the relatively low transparency of the materials from which most deformable layers are made. Another contributing factor to the poor optical quality is that the deformable layer tends to disperse light when deformed thereby causing the underlying display image to appear temporarily distorted.

The aforementioned problems associated with resistive touch panels are inherent to their fundamental design and operation. As a result, manufacturers and designers have been migrating away from resistive touch panels and toward the development of capacitive touch-sensor panels. The main advantage to capacitive touch-sensor panels is that they are not mechanically actuated. Instead, they locate target objects by sensing the presence of their electrical charge. Indeed, a target object need not necessarily make contact with the capacitive touch-sensor panel in order to be detected. This effectively eliminates the need for any flexible or moving parts. Accordingly, the touch surface of a capacitive touch-sensor panel is typically defined by a rigid transparent plate (i.e. glass), which has a much higher transparency and, therefore, optical quality than that of flexible touch surfaces. Furthermore, a glass touch surface does not deform and is, therefore, not susceptible to fatigue over time.

A capacitive touch system typically includes a capacitive sensor panel and a sensor controller. The sensor panel is a multi-layer composite structure composed of a first glass plate having a bottom surface whereon a first conductive layer is formed and a second glass plate having a bottom surface whereon a second conductive layer is formed. The first and second glass plates are typically affixed in a stacked relationship such that the first conductive layer is disposed between the bottom surface of the first plate and the top surface of the second plate. Further, the sensor panel is affixed directly over the screen of a display device (e.g., LCD) such that the second conductive layer is disposed between the bottom surface of the second glass plate and the top surface of the display screen. The conductive layers are typically composed of a transparent conductive material such as, for example, indium tin oxide (ITO) that is deposited by some suitable means (e.g., sputter deposition) and etched in specific patterns. That is, the first conductive layer typically defines a plurality of sensor rows arranged along a y-direction and the second conductive layer typically defines a plurality of sensor columns arranged along an x-direction. Accordingly, the sensor rows and sensor columns, together, define a two-dimensional xy sensor area. The sensor controller is, for example, an microcontroller chip that is electrically coupled to each of the sensor rows and columns so as to monitor their capacitive state. Further, the sensor controller is also electrically coupled to the host device so as to facilitate communication therebetween.

Figure 1:
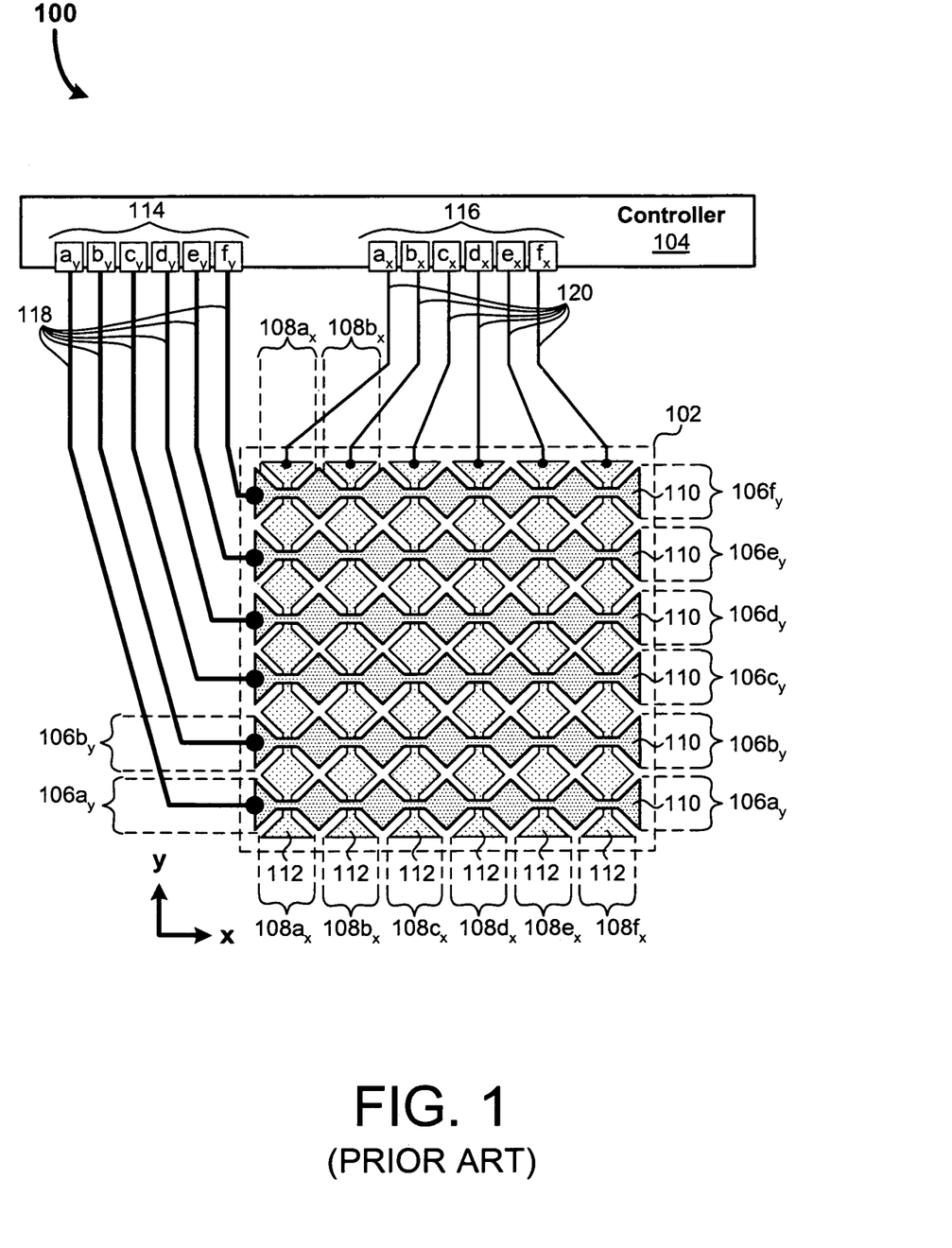
FIG. 1 is a diagram of a prior art capacitive touch system.

FIG. 1 illustrates the circuitry of a prior art capacitive touch system 100 including a sensor panel 102 and a sensor controller 104. Sensor panel 102 includes a plurality of sensor rows $106a_y\text{-}f_y$ and a plurality of sensor columns $108a_x\text{-}f_x$ juxtaposed along the y and x directions, respectively. Each of sensor rows $106a_y\text{-}f_y$ includes a discrete sensor element 110 and each of sensor columns $108a_x\text{-}f_x$ includes a discrete sensor element 112. Each sensor element 110 and 112 is a thin pattern of ITO that defines a series of connected diamond shapes extending completely across the touch surface of sensor panel 102 in the x and y directions, respectively. Sensor controller 104 includes a first set of channels $114a_y\text{-}f_y$ and a second set of channels $116a_x\text{-}f_x$. Each of channels $114a_y\text{-}f_y$ is electrically connected to the sensor element 110 of each respective one of sensor rows $106a_y\text{-}f_y$ via one of a set of signal lines 118 (e.g., conductive traces, wires, etc.). Likewise, each of channels $116a_x\text{-}f_x$ is electrically connected to the sensor element 112 of each respective one of sensor columns $108a_x\text{-}f_x$ via one of a set of signal lines 120. During the operation of touch system 100, controller 104 continuously repeats a cycle of sequentially scanning sensor rows $106a_y\text{-}f_y$ and columns $108a_x\text{-}f_x$ so as to measure the capacitive states of their respective sensor elements 110 and 112. There are many known methods for measuring the capacitive state of a sensor element such as, for example, charging the element and observing the settling time. The sample measurement is then compared to a stored value indicative of the elements normal capacitive state in the absence of a target object. When a target object approaches a particular area of sensor panel 102, the natural charge of the target object causes the capacitive state of nearby sensor elements 110 and 112 to change. Algorithms then process the capacitive change in nearby sensor elements 110 and 112 to generate y and x coordinates indicative of the touch location. Controller 104 then provides these coordinates to the hosting device where they undergo further processing for mapping the coordinates to the underlying graphical display device.

Although prior art capacitive touch system 100 has advantages over resistive touch systems, several problems still exist. For example, ITO has a relatively high resistance which imposes constraints on the length of sensor elements 110 and 112. Generally, as the series resistance of a capacitive sensor element increases, the touch sensitivity decreases. Because series resistance increases proportionally with the length of an element, sensor elements 110 and 112 have to be relatively short in order to achieve an acceptable degree of sensitivity. Consequently, the design of touch system 100 is not suitable for use in applications employing large display screens. Although the series resistance can be reduced by increasing the area of the diamond pattern, doing so reduces the sensor resolution of a sensor panel. Also, the series resistance can be reduced by using a low surface resistance ITO layer, but doing so reduces the transparency of the of the sensor elements and makes the sensor elements visible.

Figure 2:
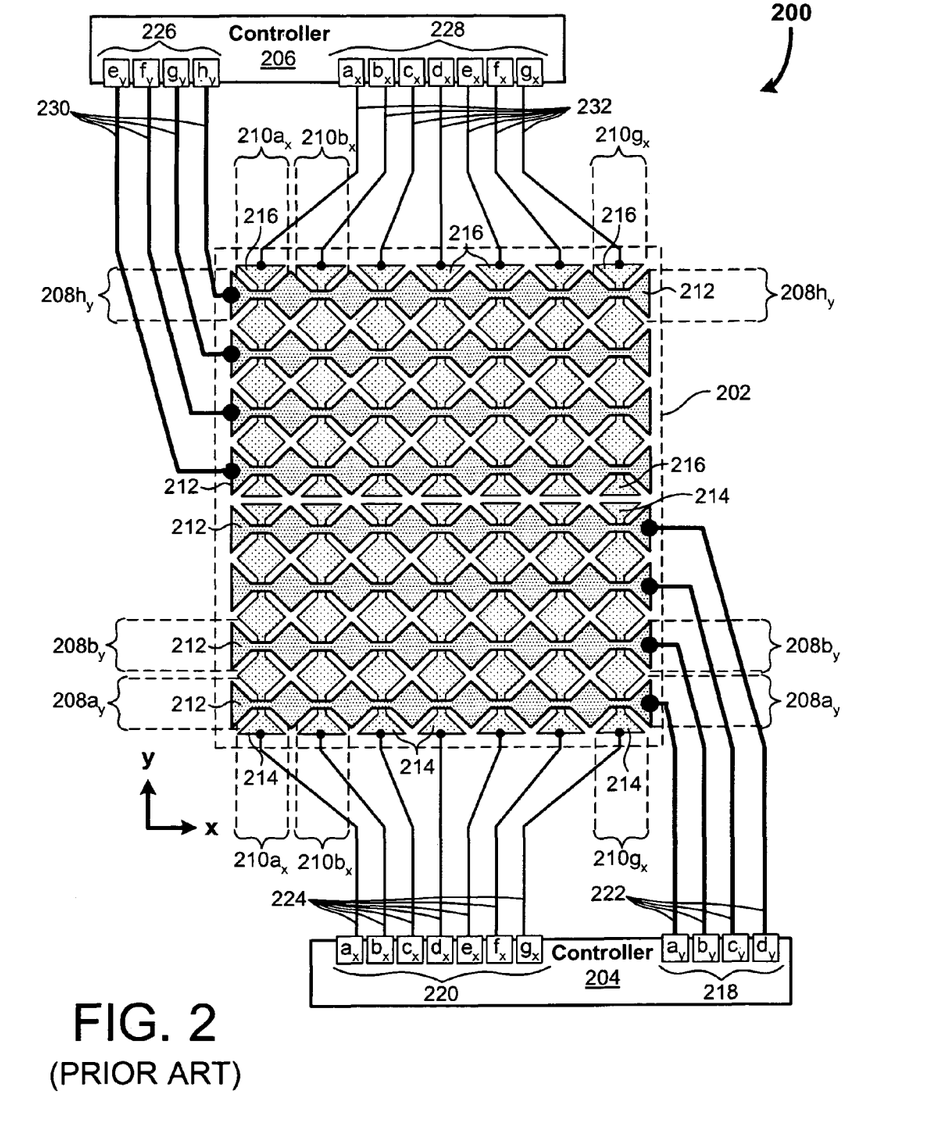
FIG. 2 is a diagram of another prior art capacitive touch system.

FIG. 2 illustrates a prior art capacitive touch system 200 that addresses the size and resolution constraints imposed by the high resistance of ITO. System 200 includes a sensor panel 202, a first sensor controller 204, and a second sensor controller 206. Sensor panel 202 includes a plurality of sensor rows $208a_y$-$h_y$ extending in the x-direction. Sensor panel 202 further includes and a plurality of sensor columns $210a_x$-$g_x$ extending in the y-direction. Each of sensor rows $208a_y$-$h_y$ includes a respective discrete sensor element 212 and each of sensor columns $210a_x$-$g_x$ includes two discrete sensor elements 214 and 216. Sensor controller 204 includes a first set of channels $218a_y$-$d_y$ and a second set of channels $220a_x$-$g_x$. Each of channels $218a_y$-$d_y$ is electrically connected to a respective sensor element 212 of a respective row $208a_y$-$h_y$ via a respective set of signal lines 222. Likewise, each of channels 220 is electrically connected to one of first sensor elements 214 of a respective sensor column $210a_x$-$g_x$ via a respective one of signal lines 224. Sensor controller 206 includes a first set of channels $226e_y$-$h_y$ and a second set of channels $228a_x$-$g_x$. Each of channels $226e_y$-$h_y$ is electrically connected to a respective sensor element 212 of a respective row $208e_y$-$h_y$ via a respective one of signal lines 230. Likewise, each of channels $228a_x$-$g_x$ is electrically connected to a second sensor element 216 of a respective one of sensor columns $210a_x$-$g_x$ via a respective one of signal lines 232. The operation of system 200 is similar to that of touch system 100 except that system 200 can support larger screen areas because each of sensor columns $210a_x$-$g_x$ includes two sensor elements (i.e. sensor elements 214 and 216) rather a single sensor column extending across the entire y distance of panel 202. Thus, the y-distance of panel 202 can be twice as long as that of panel 102.

Although system 200 can support a larger screen area than touch system 100, there are still problems with the design. For example, the x-distance of panel 202 still has to be relatively short because each of sensor rows $208a_y$-$h_y$ only includes a single sensor element 212 that extends across the entire x-distance. Accordingly, the design of system 200 only relaxes the constraints in the y-length of panel 202 and, therefore, the constraints in the x-direction still exist. As another example, controllers 204 and 206, together, have a relatively high number of channels (i.e., $218a_y$-$d_y$, $220a_x$-$g_x$, $226e_y$-$h_y$, and $228a_x$-$g_x$) in order to acquire the capacitive states of sensor elements 212, 214, and 216. In other words, system 200 has a high channel-to-sensor element ratio. Of course, as the number of required channels and, therefore, channel connections, increases, the overall reliability of system 200 decreases. Furthermore, the high number of channels also makes the manufacturing and assembly of system 200 expensive because only controllers that support a high number channels can be used.

What is needed, therefore, is a capacitive touch system design that can be used in conjunction with larger display screens. What is also need is a capacitive touch system design that improves touch sensitivity without sacrificing optical clarity and/or reducing sensor resolution. What is also needed is a capacitive touch system that has a lower channel-to-sensor element ratio. What is also needed is a capacitive touch system that has a higher reliability and cost less to manufacture.

SUMMARY

The present invention overcomes the problems associated with the prior art by providing a capacitive touch system that includes a first controller having a plurality of channels, a first sensor row having a first discrete sensor element and a second discrete sensor element, a second sensor row having a first discrete sensor element and a second discrete sensor element, a first sensor column, a second sensor column, and a first signal line electrically coupling one channel of the plurality of channels of the controller to both the first and second discrete sensor elements of the first sensor row.

In a particular embodiment, the system further includes a second controller having a plurality of channels. In a more particular embodiment, the system further includes a second signal line electrically coupling a first channel of the second controller to both the first discrete sensor element of the second sensor row and the second discrete sensor element of the second sensor row. In an even more particular embodiment, the first sensor column includes a first discrete sensor element and a second discrete sensor element, the first controller includes a second channel electrically coupled to the first discrete sensor element of the first sensor column via a third signal line, and the second controller includes a second channel electrically coupled to the second discrete sensor element of the first sensor column via a fourth signal line. In a more particular embodiment, the second sensor column includes a first discrete sensor element and a second discrete sensor element, the first controller includes a third channel electrically coupled to the first discrete sensor element of the second sensor column via a fifth signal line, and the second controller includes a third channel electrically coupled to the second discrete sensor element of the second sensor column via a sixth signal line.

In another particular embodiment, the system further includes a second controller having a first channel and a second channel, the first controller includes a second channel, the first sensor column includes a first discrete sensor element and a second discrete sensor element, and the second sensor column includes a first discrete sensor element and a second discrete sensor element. In a more particular embodiment, the first channel of the first controller is electrically connected to both the first discrete sensor element and the second discrete sensor element of the first sensor row via a first signal line. The first channel of the second controller is electrically connected to both the first discrete sensor element and the second discrete sensor element of the second sensor row via a second signal line. The second channel of the first controller is electrically connected to both the first discrete sensor element and the second discrete sensor element of the first sensor column via a third signal line. The second channel of the second controller is electrically connected to both the first discrete sensor element and the second discrete sensor element of the second sensor column via a fourth signal line.

In another more particular embodiment, the first channel of the first controller is electrically coupled to both the first and second discrete sensor elements of the first sensor row via a first signal line, the second channel of the first controller is electrically coupled to both the first and second discrete sensor elements of the second sensor row via a second signal line, the first channel of the first controller is electrically coupled to both the first and second discrete sensor elements of the first sensor column via a third signal line, and the second channel of the second controller is electrically coupled to both the first and second discrete sensor elements of the second sensor columns via a fourth signal line.

In yet another particular embodiment, the first sensor row includes a first discrete sensor element and a second discrete sensor element, the second sensor row includes a first discrete sensor element and a second discrete sensor element, the first column includes a first and second discrete sensor element, and the second column includes a first discrete sensor element and a second discrete sensor element. Further, the first controller includes a first channel, a second channel, a third channel, and a fourth channel. The first channel is electrically coupled to both the first and second discrete sensor elements of the first sensor row via a first signal line, the second channel is electrically coupled to both the first and second discrete sensor elements of the second sensor row via a second signal line, the third channel is electrically coupled to both the first and second discrete sensor elements of the first sensor column via a third signal line, and the fourth channel is electrically coupled to both the first and second discrete sensor elements of the second sensor column via a fourth signal line.

In the example embodiments, the discrete sensor elements are formed from a transparent conductive material such as, for example, indium tin oxide. Also in the example embodiments, each discrete sensor element includes a plurality diamond shapes connected in series. In addition, a first set of discrete sensor elements and a second set of discrete sensor elements are disposed in an overlayed relationship with a transparent and electrically insulating material disposed between the two sets (e.g., the sensor rows and the sensor columns) of discrete sensor elements.

In the example embodiments, at least some of the sensor elements are open ended electrodes that are electrically connected to the channels of the controllers in parallel.

According to one method of detecting a touch, the capacitive state of the first discrete sensor element and the second discrete sensor element of the first sensor row are measured simultaneously at a common node.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a capacitive touch system that can support larger display sizes. In the following description, numerous specific details are set forth (e.g., number of sensor rows and columns, specific sensor element patterns, etc.) in order to provide a thorough understanding of the invention. Those skilled in the art will recognize, however, that the invention may be practiced apart from these specific details. In other instances, details of well known sensor data acquisition practices (e.g., noise filtering, signal amplification, multiplexing, self capacitance measuring, etc.) and components have been omitted, so as not to unnecessarily obscure the present invention.

Figure 3:
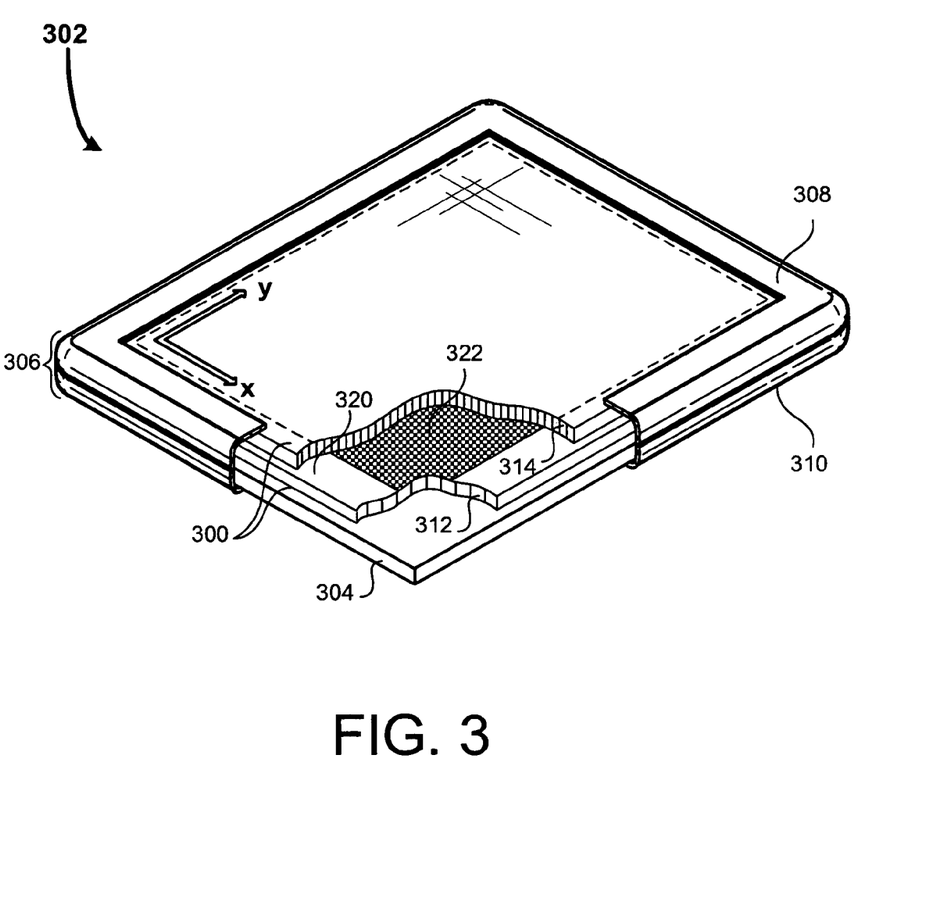
FIG. 3 a partially cut-away, perspective view of a capacitive touch system shown incorporated into a host device, according to one embodiment of the present invention.

FIG. 3 shows a perspective view of a capacitive touch system 300 according to one embodiment of the present invention. In this example, capacitive touch system 300 is the primary user input/output system of a host device 302 that represents a capacitive touch system hosting device (e.g., tablet computer, PDA, MP3 player, cell phone, etc.). Hosting device 302 further includes a circuit board 304 and a housing 306. Circuit board 304 represents the main circuitry of host device 302 that carries out general computing operations such as data communication, processing, storage, etc. Housing 306 includes a bezel 308 and a rear cover 310 coupled to one another from opposite sides of device 302 so as to protect the inner components of device 302, while also permitting direct interaction between a user and capacitive touch system 300. Those skilled in the art will recognize that, apart from capacitive touch system 300, specific details related to host device 302 will vary depending on the application and are not particularly relevant to the present. Therefore, circuit board 304 and housing 306 are representational in character only.

Figure 5:
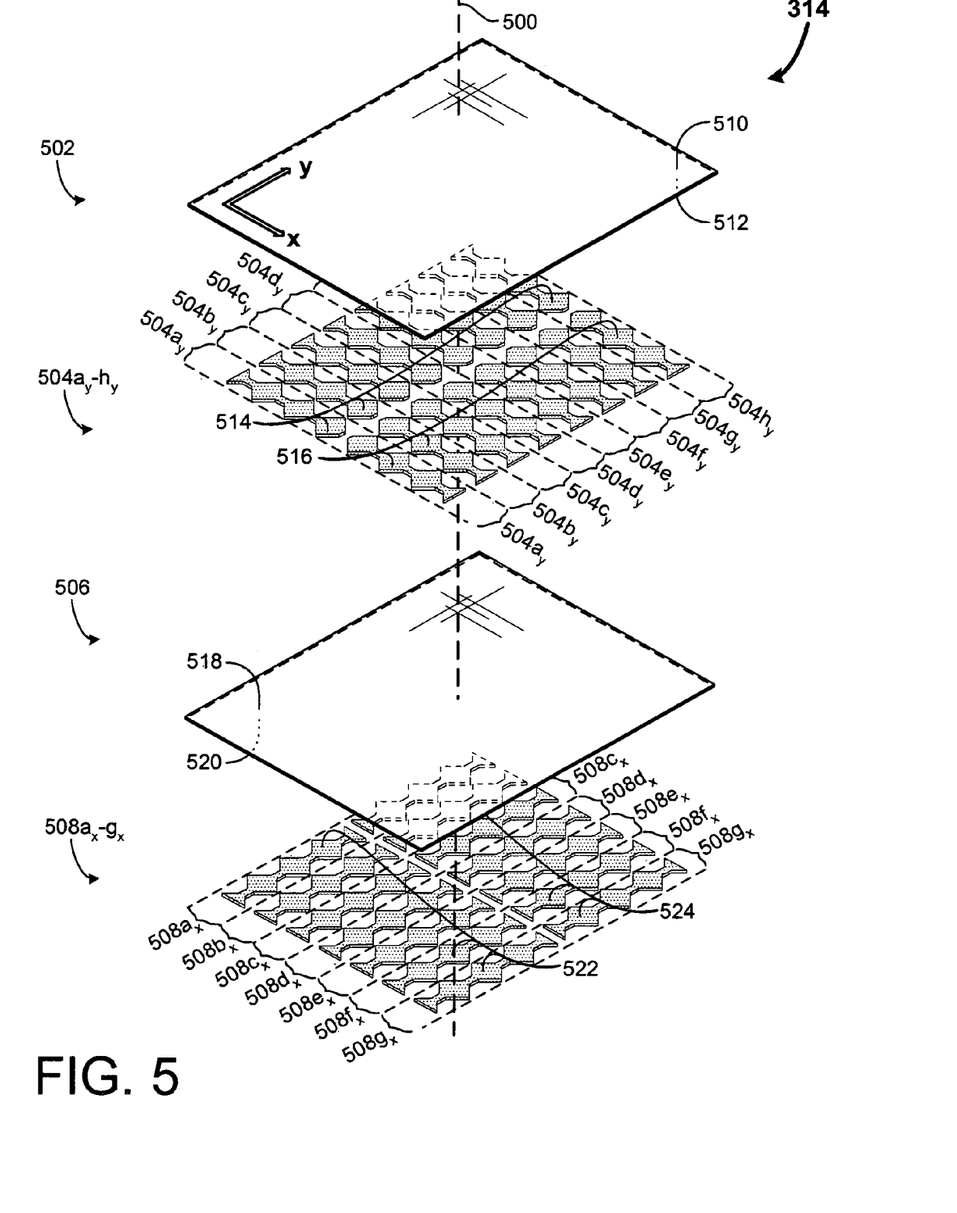
FIG. 5 is an exploded, perspective view of a sensor panel of the capacitive touch system of FIG. 3.

Capacitive touch system 300 includes a graphical display device 312, a capacitive sensor panel 314, and two controllers 316 and 318 (both controllers shown in FIG. 5). Graphical display device 312 is, for example, a liquid crystal display (LCD) having a top surface 320 that defines screen 322 for displaying graphical output information. Further, graphical display device 312 is mounted on and electrically coupled to circuit board 304 so as to facilitate data communication therebetween. Sensor panel 314 is a transparent capacitive touch-sensing device that receives user inputs from a target object (e.g., finger, stylus, etc.) by detecting the presence of its electrical charge at specific locations within a two-dimensional xy region. Sensor panel 314 and graphical display device 312 are coupled together in a stacked relationship wherein sensor panel 314 is mounted on top surface 320 over screen 322. Accordingly, graphical output information from screen 322 is displayed through sensor panel 314. Each of controllers 316 and 318 is, for example, a microcontroller chip that acquires sensor data from a respective different region of sensor panel 314. Further, controllers 316 and 318 are electrically coupled to circuit board 304 so that sensor data indicative of the target object's location can be communicated to and further processed by the processing circuitry of circuit board 304. Those skilled in the art will recognize that the specific locations of controllers 316 and 318 are not particularly relevant to the present invention. However, the electrical connections between controllers 316, 318, and sensor panel 314 are particularly important and, therefore, will be discussed in detail below with reference to FIG. 6.

Figure 4:
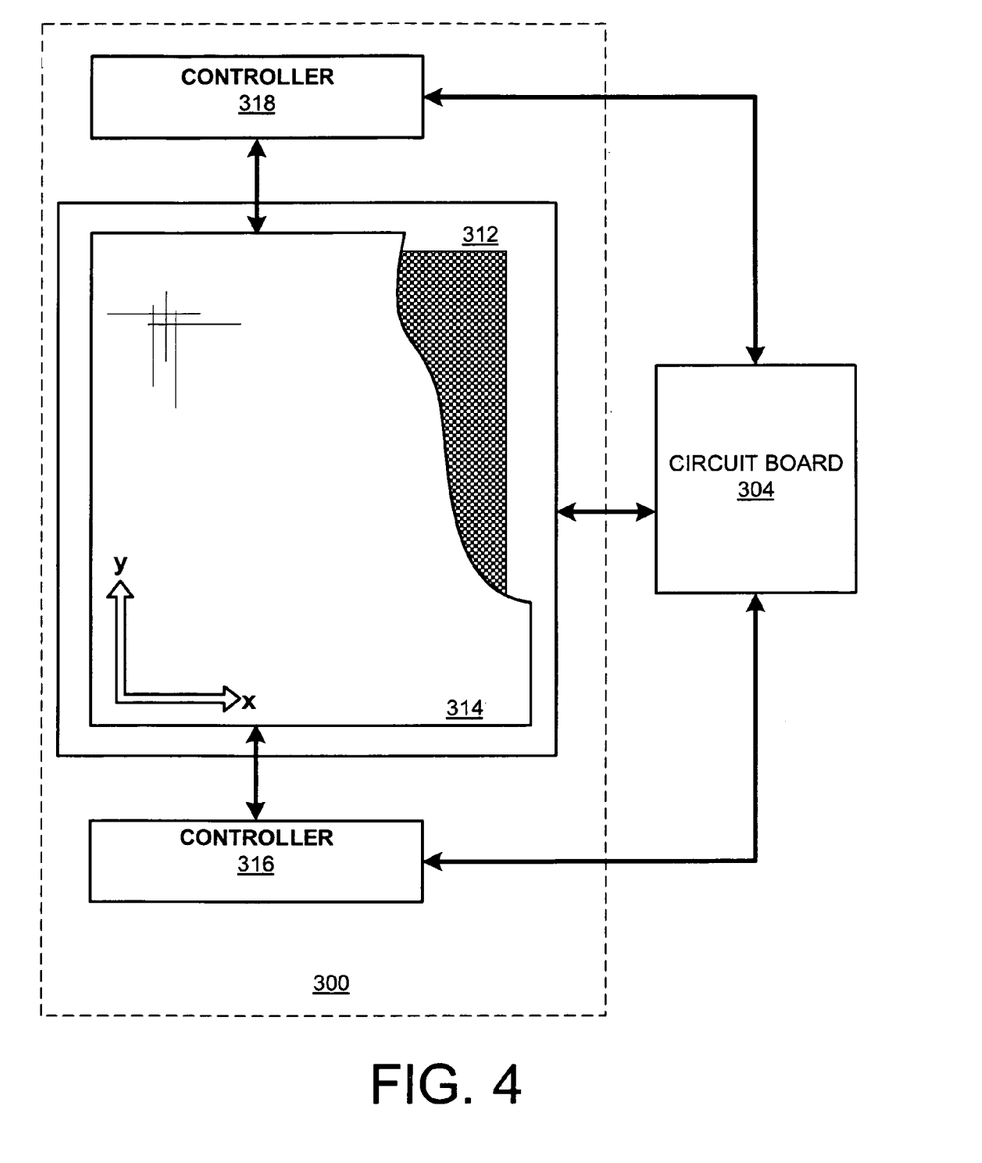
FIG. 4 is a block diagram illustrating the electrical communication between the capacitive touch system of FIG. 3 and a circuit board of the host device.

FIG. 4 is a block diagram that illustrates electrical communication between touch system 300 and circuit board 304 of host device 302. As shown, controller 316 and 318 communicate with sensor panel 314. More specifically, each of controllers 316 and 318 acquires sensor measurements from a different region of sensor panel 314. Controllers 316 and 318 process the measurements and generate data that is indicative of the target object's location. Then, the data is converted into a format that can be communicated to circuit board 304. Circuit board 304 receives the position data from both controllers 316 and 318 for further processing. Circuit board 304 also communicates with graphical display device 312 to provide data and instructions indicative of graphical information that is to be displayed by screen 322. Although not shown, it typically a display driver would facilitate communication between circuit board 304 and graphical display device 312. However, the specific details associated with graphical display device 312 and, as previously mentioned, circuit board 304 are not particularly relevant to the present invention, and so will not be disclosed in greater detail.

FIG. 5 shows a perspective view of sensor panel 314 exploded along an axis 500. In this particular embodiment, sensor panel 314 is a transparent composite structure composed of a first substrate 502, a plurality of sensor rows $504a_y$-$h_y$, a second transparent substrate 506, and a plurality of sensor columns $508a_x$-$g_x$. As shown, substrate 502 is disposed above rows $504a_y$-$h_y$, rows $504a_y$-$h_y$ are disposed between substrate 502 and substrate 506, substrate 506 is disposed between rows $504a_y$-$h_y$ and columns $508a_x$-$g_x$, and columns $508a_x$-$g_x$ are disposed below substrate 506.

Substrate 502 is a rigid, transparent, and electrically insulating structure such as, for example, a thin glass plate. Further, substrate 502 includes a top surface 510 and an opposite bottom planar surface 512. Top surface 510 defines a planar touch surface that is contacted by a target object during user input events. Note that, to avoid confusion, various aspects of panel 314 will be described with reference to a two-dimensional xy-plane shown on top surface 510.

Sensor rows $504a_y$-$h_y$ are arranged in the y-direction and extend across panel 314 in the x-direction such that each of rows $504a_y$-$h_y$ is located at a different y-location. Each of sensor rows $504a_y$-$h_y$ includes a first discrete sensor element 514 and a second discrete sensor element 516 extending toward one another from opposite directions such that each occupies a different region of the same row. Although each pair of sensor elements 514 and 516 occupies a different region of the same row, they are aligned to correspond with the same y-coordinate. In this particular embodiment, each of sensor elements 514 and 516 is composed of a transparent conductive material (e.g., ITO) that is patterned on substrate 502 to define a series of connected diamond shapes arranged along the x-direction. Because sensor elements 514 and 516 are composed of a conductive material, each has a measurable self capacitance which changes in the presences of a target object (e.g., a finger, a stylus, etc.).

Substrate 506 is similar to substrate 502 in that it is a rigid, transparent, and electrically insulating structure such as, for example, a thin glass plate. Further, substrate 506 includes a top surface 518 and an opposite bottom planar surface 520. Substrate 506 acts as an insulating barrier between sensor rows $504a_y$-$h_y$ and sensor columns $508a_x$-$g_x$.

Sensor columns $508a_x$-$g_x$ are spaced along the x-direction and extend across panel 314 in the y-direction such that each of columns $508a_x$-$g_x$ is located at different x-location. Each of sensor columns $508a_x$-$g_x$ includes a first discrete sensor element 522 and a second discrete sensor element 524 extending toward one another from opposite directions such that each occupies a different region of the same column. Although each pair of sensor elements 522 and 524 occupies a different region of the same column, they are aligned to correspond with the same x-coordinate. In this particular embodiment, each of sensor elements 522 and 524 is composed of a transparent conductive material (e.g., ITO) that is patterned on substrate 506 to define series of connected diamond shapes arranged along the y-direction. Like sensor elements 514 and 516, sensor elements 522 and 524 are also composed of a conductive material and, therefore, also have a measurable self capacitance which changes in the presences of a target object.

In this particular embodiment, sensor rows 504 and sensor columns 508 are formed by depositing an ITO layer directly on bottom surface 512 of substrate 502 and bottom surface 520 of substrate 506, respectively, by some suitable means such as, for example, sputter deposition. Then, the ITO layer formed on surface 512 is etched to define sensor elements 514 and 516, and the ITO layer formed on surface 520 is etched to define sensor elements 522 and 524. After the ITO layers are etched, substrates 502 and 506 are permanently bonded to one another in a stacked relation such that bottom surface 512 of substrate 502, having sensor rows 504 formed thereon, is bonded to top surface 518 of substrate 506 via, for example, a transparent non-conductive pressure sensitive adhesive (PSA) disposed therebetween. Similarly, sensor panel 314 is mounted on graphical display 312 such that bottom surface 520 of substrate 506, having sensor columns 508 formed thereon, is bonded to top surface 320 of graphical display device 312 via, for example, a PSA disposed therebetween.

Figure 6:
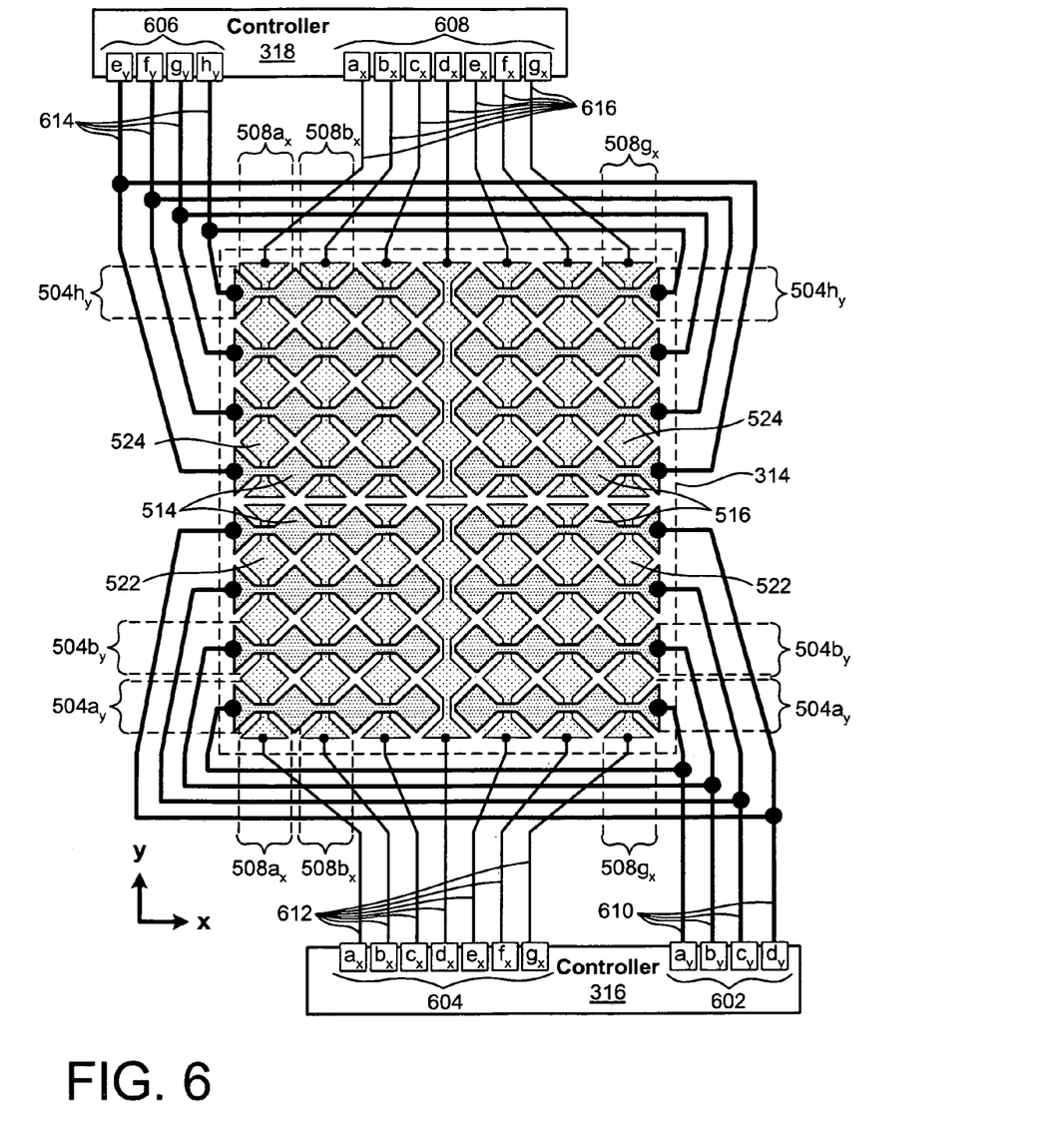
FIG. 6 is a diagram illustrating the electrical connections between a sensor panel, a first controller, and a second controller.

FIG. 6 is a schematic circuit diagram illustrating the circuitry between sensor panel 314, first controller 316, and second controller 318. As previously mentioned, each of controllers 316 and 318 is operative to control a different region of touch-sensor panel 314. More specifically, first controller 316 controls sensor rows $504a_y$-$d_y$ and each first discrete sensor element 522 of sensor columns $508a_x$-$g_x$. Controller 318 controls sensor rows $504e_y$-$h_y$ and each second discrete sensor element 524 of sensor columns $508a_x$-$g_x$. Controller 316 includes a first set of channels $602a_y$-$d_y$ (a plurality of separate inputs) and a second set of channels $604a_x$-$g_x$ (another plurality of separate inputs). Similarly, controller 318 includes a first set of channels $606e_y$-$h_y$ and a second set of channels $608a_x$-$g_x$.

First channels $602a_y$-$d_y$ of controller 316 are electrically connected to respective sensor rows $504a_y$-$d_y$ via a set of signal lines 610. More specifically, each of signal lines 610 electrically connects one of channels $602a_x$-$g_x$ to the first sensor element 514 and the second sensor element 516 of a respective one of rows $504a_y$-$d_y$. That is, channel $602a_y$ is electrically connected to both sensor elements 514 and 516 of respective sensor row $504a_y$ via a first one signal lines 610, channel $602b_y$ is electrically connected to both sensor elements 514 and 516 of respective sensor row $504b_y$ via a second one of signal lines 610, channel $602c_y$ is electrically connected to both sensor elements 514 and 516 of respective sensor row $504c_y$ via a third one signal lines 610, and channel $602d_y$ is electrically connected to both sensor elements 514 and 516 of respective sensor row $504d_y$ via a fourth one signal lines 610. Accordingly, each pair of sensor elements 514 and 516 of sensor rows $504a_y$-$d_y$ share a common node with a respective one of channels $602a_y$-$d_y$.

Second channels $604a_x$-$g_x$ are electrically connected first sensor elements 522 of respective sensor columns $508a_x$-$g_x$ via a set of signal lines 612. That is, channel $604a_x$ is electrically connected to sensor element 522 of respective sensor column $508a_x$ via a first one signal lines 612, channel $604b_x$ is electrically connected to sensor element 522 of respective sensor column $508b_x$ via a second one of signal lines 612, channel $604c_x$ is electrically connected to sensor element 522 of respective sensor column $508c_x$ via a third one of signal lines 612, channel $604c_x$ is electrically connected to sensor element 522 of respective sensor column $508c_x$ via a third one of signal lines 612, channel $604d_x$ is electrically connected to sensor element 522 of respective sensor column $508d_x$ via a fourth one of signal lines 612, channel $604e_x$ is electrically connected to sensor element 522 of respective sensor column $508e_x$ via a fifth one of signal lines 612, channel $604f_x$ is electrically connected to sensor element 522 of respective sensor column $508f_x$ via a sixth one of signal lines 612, and channel $604g_x$ is electrically connected to sensor element 522 of respective sensor column $508g_x$ via a seventh one of signal lines 612. Accordingly, each of channels $604a_x$-$g_x$ shares a common node with a respective one of sensor elements 522.

First channels $606e_y$-$h_y$ of controller 318 are electrically connected to respective sensor rows $504e_y$-$h_y$ via a set of signal lines 614. More specifically, each of signal lines 614 electrically connects one of channels $606e_x$-$h_x$ to the first sensor element 514 and second sensor element 516 of a respective one of rows $504e_y$-$h_y$. That is, channel $606e_y$ is electrically connected to both sensor elements 514 and 516 of respective sensor row $504e_y$ via a first one signal lines 614, channel $606f_y$ is electrically connected to both sensor elements 514 and 516 of respective sensor row $504f_y$ via a second one of signal lines 614, channel $606g_y$ is electrically connected to both sensor elements 514 and 516 of respective sensor row $504g_y$ via a third one signal lines 614, and channel $606h_y$ is electrically connected to both sensor elements 514 and 516 of respective sensor row $504h_y$ via a fourth one signal lines 614. Accordingly, each pair of sensor elements 514 and 516 of sensor rows $504e_y$-$h_y$ shares a common node with a respective one of channels $608e_y$-$h_y$.

Second channels $608a_x$-$g_x$ are electrically connected second sensor elements 524 of respective sensor columns $508a_x$-$g_x$ via a set of signal lines 616. That is, channel $608a_x$ is electrically connected to sensor element 524 of respective sensor column $508a_x$ via a first one signal lines 616, channel $608b_x$ is electrically connected to sensor element 524 of respective sensor column $508b_x$ via a second one of signal lines 616, channel $608c_x$ is electrically connected to sensor element 524 of respective sensor column $508c_x$ via a third one of signal lines 616, channel $608c_x$ is electrically connected to sensor element 524 of respective sensor column $508c_x$ via a third one of signal lines 616, channel $608d_x$ is electrically connected to sensor element 524 of respective sensor column $508d_x$ via a fourth one of signal lines 616, channel $608e_x$ is electrically connected to sensor element 524 of respective sensor column $508e_x$ via a fifth one of signal lines 616, channel $608f_x$ is electrically connected to sensor element 524 of respective sensor column $508f_x$ via a sixth one of signal lines 616, and channel $608g_x$ is electrically connected to sensor element 524 of respective sensor column $508g_x$ via a seventh one of signal lines 616. Accordingly, each of channels $608a_x$-$g_x$ shares a common node with a respective one of sensor elements 524.

During operation, the capacitive state of each individual one of sensor rows $504a_y$-$d_y$ is measured at a respective one of channels $602a_y$-$g_y$, the capacitive state of each sensor element 522 of columns $508a_x$-$g_x$ is measured at respective channels $604a_x$-$g_x$, the capacitive state of each individual one sensor rows $504e_y$-$h_y$ is measured at a respective one of channels $606e_y$-$h_y$, and the capacitive state of each sensor element 524 of columns $508a_x$-$g_x$ is measured at respective channels $608a_x$-$g_x$. It follows that when a touch event takes place on the lower half of surface 510, the measurements acquired at channels $602a_y$-$d_y$ and channels $604a_x$-$g_x$ correspond with a y-coordinate and an x-coordinate, respectively, that, together, define the location of the target object. When a touch event takes place on the upper half of surface 510, the measurements acquired at channels $606e_y$-$h_y$ and channels $608a_x$-$g_x$ correspond with a y-coordinate and x-coordinate, respectively, indicative of the target object location.

Because each first sensor element 514 shares a common node with a respective one of second sensor elements 516, the total capacitive state of a pair of sensor elements 514 and 516 is simultaneously measured at single channel. Of course, this measurement corresponds to the capacitive state of the sensor row at which the pair of sensor elements is located. It should be recognized that this enables sensor rows $504a_y$-$h_y$ to be twice as long as those of prior art sensor rows $208a_y$-$h_y$, without increasing the number of required controller channels, sacrificing optical clarity, reducing touch sensitivity, and/or reducing sensor resolution. Indeed, sensor panel 314 can support the same surface area as that of sensor panel 202 using half the number of channels to measure sensor row capacitance. By decreasing the number of controller channels in system 300, reliability is improved, controller design is simplified, and the overall manufacturing cost is reduced when compared to prior art capacitive touchscreen systems.

Figure 7:
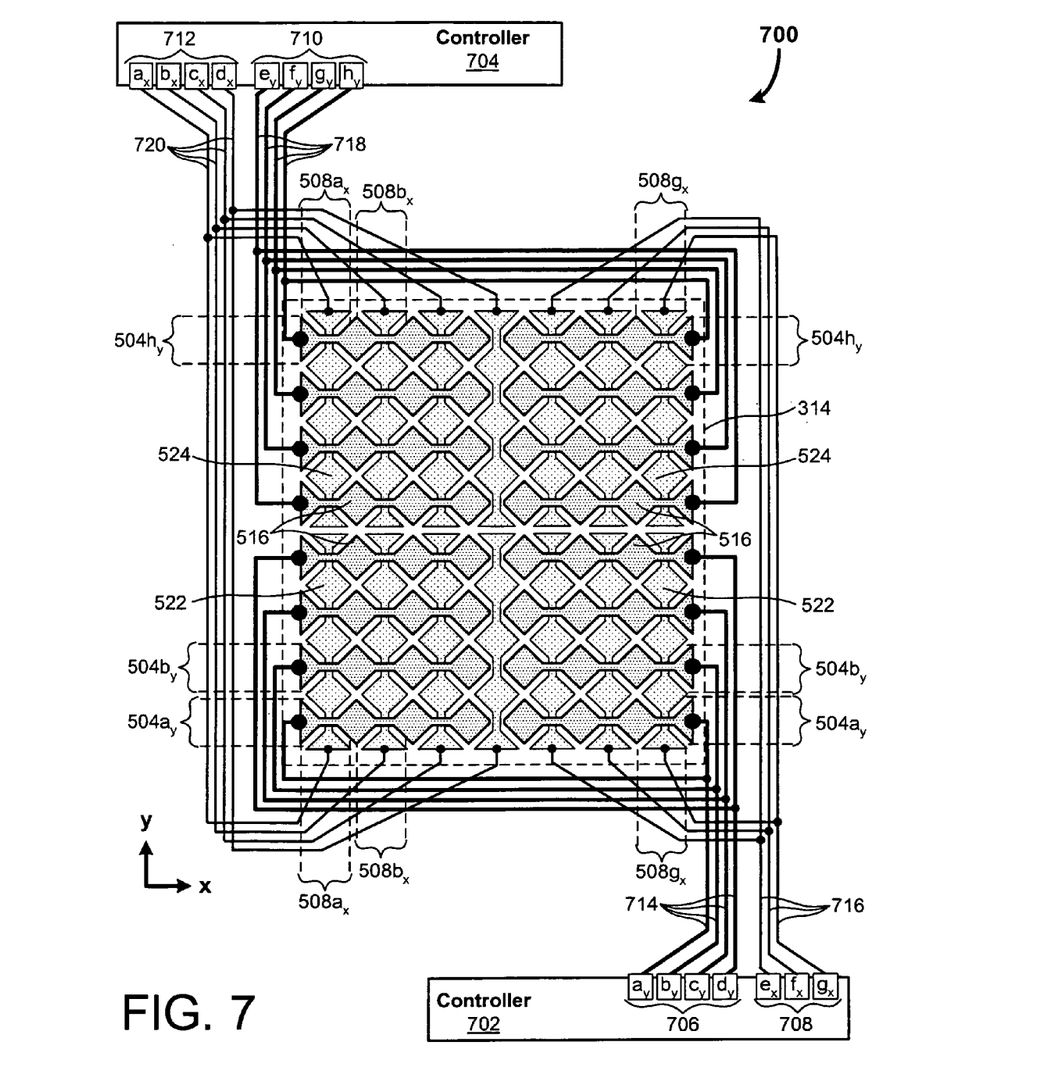
FIG. 7 is a diagram illustrating the electrical connections between a sensor panel, an alternate first controller, and an alternate second controller, according to another embodiment of the present invention.

FIG. 7 is a schematic circuit diagram illustrating an alternative embodiment 700 of the present invention, wherein sensor panel 314 is shown electrically connected to a different first controller 702 and second controller 704. In this particular embodiment, sensor rows $504a_y$-$d_y$ and sensor columns $508e_x$-$g_x$ are controlled/monitored by controller 702 while sensor rows $504e_y$-$h_y$ and sensor columns $508a_x$-$d_x$ are controlled/monitored by controller 704. Controller 702 includes a first set of channels $706a_y$-$d_y$ and a second set of channels $708e_x$-$g_x$. Similarly, controller 704 includes a first set of channels $710e_y$-$h_y$ and a second set of channels $712a_x$-$d_x$.

First channels $706a_y$-$d_y$ are electrically connected to respective sensor rows $504a_y$-$d_y$ via a set of signal lines 714. More specifically, each of signal lines 714 electrically connects one of channels $706a_y$-$d_y$ to the first sensor element 514 and the second sensor element 516 of a respective one of rows $504a_y$-$d_y$. That is, channel $706a_y$ is electrically connected to both sensor elements 514 and 516 of respective sensor row $504a_y$ via a first one signal lines 714, channel $706b_y$ is electrically connected to both sensor elements 514 and 516 of respective sensor row $504b_y$ via a second one of signal lines 714, channel $706c_y$ is electrically connected to both sensor elements 514 and 516 of respective sensor row $504c_y$ via a third one signal lines 714, and channel $706d_y$ is electrically connected to both sensor elements 514 and 516 of respective sensor row $504d_y$ via a fourth one signal lines 714. Accordingly, each pair of sensor elements 514 and 516 of sensor rows $504a_y$-$d_y$ shares a common node with a respective one of channels $706a_y$-$d_y$.

Second channels $708e_x$-$g_x$ of controller 702 are electrically connected to respective sensor columns $508e_x$-$g_x$ via a set of signal lines 716. More specifically, each of signal lines 716 electrically connects one of channels $708e_x$-$g_x$ to the first sensor element 522 and second sensor element 524 of a respective one of columns 508$e_x$-$g_x$. That is, channel 708$e_x$ is electrically connected to both sensor elements 522 and 524 of respective sensor column 508$e_x$ via a first one of signal lines 714, channel 708$f_x$ is electrically connected to both sensor elements 522 and 524 of respective sensor column 508$f_x$ via a second one of signal lines 714, and channel 708$g_x$ is electrically connected to both sensor elements 522 and 524 of respective sensor column 508$g_x$ via a third one of signal lines 714. Accordingly, each pair of sensor elements 522 and 524 of sensor columns 508$e_x$-$g_x$ shares a common node with a respective one of channels 708$e_x$-$g_y$.

First channels 710$e_y$-$h_y$ of controller 704 are electrically connected to respective sensor rows 504$e_y$-$h_y$ via a set of signal lines 718. More specifically, each of signal lines 718 electrically connects one of channels 710$e_y$-$h_y$ to the first sensor element 514 and second sensor element 516 of a respective one of rows 504$e_y$-$h_y$. That is, channel 710$e_y$ is electrically connected to both sensor elements 514 and 516 of respective sensor row 504$e_y$ via a first one signal lines 718, channel 710$f_y$ is electrically connected to both sensor elements 514 and 516 of respective sensor row 504$f_y$ via a second one of signal lines 718, channel 710$g_y$ is electrically connected to both sensor elements 514 and 516 of respective sensor row 504$g_y$ via a third one signal lines 718, and channel 710$h_y$ is electrically connected to both sensor elements 514 and 516 of respective sensor row 504$h_y$ via a fourth one signal lines 718. Accordingly, each pair of sensor elements 514 and 516 of sensor rows 504$e_y$-$h_y$ shares a common node with a respective one of channels 710$e_y$-$h_y$.

Second channels 712$a_x$-$d_x$ of controller 704 are electrically connected to respective sensor columns 508$a_x$-$d_x$ via a set of signal lines 720. More specifically, each of signal lines 720 electrically connects one of channels 712$a_x$-$d_x$ to the first sensor element 522 and second sensor element 524 of a respective one of columns 508$a_x$-$d_x$. That is, channel 712$a_x$ is electrically connected to both sensor elements 522 and 524 of respective sensor column 508$a_x$ via a first one of signal lines 720, channel 712$b_x$ is electrically connected to both sensor elements 522 and 524 of respective sensor column 508$b_x$ via a second one of signal lines 720, channel 712$c_x$ is electrically connected to both sensor elements 522 and 524 of respective sensor column 508$c_x$ via a third one of signal lines 720, and channel 712$d_x$ is electrically connected to both sensor elements 522 and 524 of respective sensor column 508$d_x$ via a fourth one of signal lines 720. Accordingly, each pair of sensor elements 522 and 524 of sensor columns 508$a_x$-$d_x$ shares a common node with a respective one of channels 712$a_x$-$d_x$.

Because each first sensor element 514 shares a common node with a respective one of second sensor elements 516, the total capacitive state of a pair of sensor elements 514 and 516 is simultaneously measured at a single channel. Likewise, each first sensor element 522 shares a common node with a respective one of second sensor elements 522 such that the total capacitive state of a pair of sensor elements 522 and 524 is also simultaneously measured at single channel. Accordingly, the total number of channels required to measure the capacitive state of columns 508$a_x$-$g_x$ is effectively reduced to half the total number of channels required to measure the capacitive state of prior art sensor columns 210$a_x$-$g_x$ shown in FIG. 2. Not only are far fewer channels required, sensor panel 314 can achieve at least the same touch sensitivity, optical clarity, and touch resolution on a significantly larger screen. Of course, with like screen sizes, sensor panel 314 can be optimized to achieve significantly higher sensitivity, optical clarity, and touch resolution than can prior art sensor panel 202.

Although not shown, the circuitry of diagram 700 could optionally be arranged such that channels 706$a_y$-$d_y$ and 710$e_y$-$h_y$ are located on controller 702, and channels 712$a_x$-$d_x$ and 708$e_x$-$g_x$ are located on controller 704. In such a case, controller 702 would be responsible for controlling all of sensor rows 504$a_y$-$h_y$ while controller 704 would be responsible for controlling all of sensor columns 508$a_x$-$g_x$. Thus, the y-coordinate of the touch location would be generated from controller 702 and the x-coordinate from controller 704.

The description of particular embodiments of the present invention is now complete. Many of the described features may be substituted, altered or omitted without departing from the scope of the invention. For example, alternate conductive substrates (e.g., aluminum zinc oxide), may be used in place of ITO. As another example, alternate transparent insulating (e.g., polycarbonate) substrates may be substituted for the glass plates. As yet another example, although the rows/columns of the disclosed embodiments are each divided into two discrete sensor elements, touch panel size can be further increased by including three or more discrete sensor elements in each column or row. These and other deviations from the particular embodiments shown will be apparent to those skilled in the art, particularly in view of the foregoing disclosure.

We claim:

1. A capacitive touch sensor system comprising:
   a first controller having a plurality of channels;
   a first sensor row extending along a first direction, said first sensor row having a first discrete sensor element, a second discrete sensor element, and a third discrete sensor element, wherein each of the first discrete sensor element, the second discrete sensor element, and the third discrete sensor element of the first sensor row occupy a different region of the first sensor row;
   a second sensor row extending along said first direction, said second sensor row having a first discrete sensor element, a second discrete sensor element, and third discrete sensor element, wherein each of the first discrete sensor element, the second discrete sensor element, and the third discrete sensor element of the second sensor row occupy a different region of the second sensor row, the first and second sensor rows being a transparent conductive material deposited and etched on a surface of a first substrate;
   a first sensor column extending along a second direction, said first sensor column having a first discrete sensor element and a second discrete sensor element;
   a second sensor column extending along said second direction, said second sensor column having a first discrete sensor element and a second discrete sensor element, the first and second sensor columns being a transparent conductive material deposited and etched on a surface of a second, different substrate, the first substrate and the second substrate bonded to one another in a stacked relation such that a bottom surface of the first substrate having sensor rows formed thereon is bonded to a top surface of the second substrate with an adhesive disposed therebetween and the bottom surface of the second substrate having sensor columns formed thereon is bonded to a top surface of a graphical display device; and
   a first signal line electrically coupling a first channel of said plurality of channels of said controller to said discrete sensor elements of said first sensor row.

2. A capacitive touch sensor system according to claim 1, further comprising a second controller having a plurality of channels.

3. A capacitive touch sensor system according to claim 2, further comprising a second signal line electrically coupling a first one of said plurality of channels of said second controller to said first discrete sensor element of said second sensor row and said second discrete sensor element of said second sensor row.

4. A capacitive touch sensor system according to claim 3, wherein
said plurality of channels of said first controller includes a second channel;
said plurality of channels of said second controller includes a second channel; and
said capacitive touch sensor system further comprises a third signal line and a fourth signal line, said third signal line electrically coupling said second channel of said first controller to said first discrete sensor element of said first sensor column and said fourth signal line electrically coupling said second channel of said second controller to said second discrete sensor element of said first sensor column.

5. A capacitive touch sensor system according to claim 4, wherein
said plurality of channels of said first controller includes a third channel;
said plurality of channels of said second controller includes a third channel; and
said capacitive touch sensor system further comprises a fifth signal line and a sixth signal line, said fifth signal line electrically coupling said first discrete sensor element of said second sensor column and said third channel of said first controller, said sixth signal line electrically coupling said second discrete sensor element of said second sensor column and said third channel of said second controller.

6. A capacitive touch sensor system according to claim 4, wherein said transparent conductive material is indium tin oxide.

7. A capacitive touch sensor system according to claim 6, wherein said discrete sensor elements include a plurality of diamond shaped segments of said conductive material connected in series.

8. A capacitive touch sensor system according to claim 3, wherein
said plurality of channels of said first controller includes a second channel; and
said capacitive touch sensor system further comprises a third signal line and a fourth signal line, said third signal line electrically coupling said second channel of said first controller to said first discrete sensor element of said first sensor column and said second discrete element of said first sensor column.

9. A capacitive touch sensor system according to claim 8, wherein
said second controller includes a second channel; and
said capacitive touch sensor system further comprises a fourth signal line electrically coupling said second channel of said second controller to said first discrete sensor element of said second sensor column and said second discrete sensor element of said second sensor column.

10. A capacitive touch sensor system according to claim 1, further comprising a second signal line electrically coupling a second channel of said first controller to said first discrete sensor element of said second sensor row and said second discrete sensor element of said second sensor row.

11. A capacitive touch sensor system according to claim 10, wherein
said plurality of channels of said first controller includes a third channel; and
said capacitive touch sensor system further comprises a third signal line electrically coupling said third channel of said first controller to said first discrete sensor element of said first sensor column and said second discrete sensor element of said first sensor column.

12. A capacitive touch sensor system according to claim 11, wherein
said plurality of channels of said first controller includes a fourth channel; and
said capacitive touch sensor system further comprises a fourth signal line electrically coupling said fourth channel of said first controller to said first discrete sensor element of said second sensor column and said second discrete sensor element of said second sensor column.

13. A capacitive touch sensor system according to claim 10, further comprising a second controller having a plurality of channels.

14. A capacitive touch sensor system according to claim 13, wherein
said plurality of channels of said second controller includes a first channel; and
said capacitive touch sensor system further comprises a third signal line electrically coupling said first channel of said second controller to said first discrete sensor element of said first sensor column and said second discrete sensor element of said first sensor column.

15. A capacitive touch sensor system according to claim 14, wherein
said plurality of channels of said second controller includes a second channel; and
said capacitive touch sensor system further comprises a fourth signal line electrically coupling said second channel of said second controller to said first discrete sensor element of said second sensor column and said second discrete sensor element of said second sensor column.

16. A capacitive touch sensor system according to claim 1, wherein said transparent conductive material is indium tin oxide.

17. A capacitive touch sensor system according to claim 16, wherein:
said transparent conductive material defines the first set of discrete sensor elements and the second set of sensor elements;
each discrete sensor element of said first set of discrete sensor elements includes a chain of diamond shapes connected in series along said first direction;
each discrete sensor element of said second set of discrete sensor elements includes a chain of diamond shapes connected in series along said second direction;
said first set of discrete sensor elements and said second set of discrete sensor elements are disposed in an overlayed relationship so as to form a two-dimensional array of diamond shapes; and
said first set of discrete sensor elements and said second set of discrete sensor elements are electrically insulated from one another.

18. A capacitive touch sensor system according to claim 1, wherein said sensor rows are formed on a first rigid transparent substrate and said sensor columns are formed on a second rigid transparent substrate.

19. A capacitive touch sensor system according to claim 1, further comprising a transparent and electrically insulating material disposed between said sensor rows and said sensor columns.

20. A capacitive touch sensor system according to claim 1, wherein the capacitive state of said first discrete sensor element of said first sensor row and said second discrete sensor element of said first sensor row are measured simultaneously at a common node.

21. A capacitive touch sensor system according to claim 1, wherein said first discrete sensor element and said second discrete sensor element are open ended electrodes being electrically connected in parallel.

22. A capacitive touch system according to claim 1, wherein said first direction is orthogonal to said second direction.

23. A touch display system comprising:
a controller having a plurality of channels;
a display;
a first sensor row overlying said display and extending along a first direction, said first sensor row having a first discrete sensor element, a second discrete sensor element, and a third discrete sensor element, wherein each of the first discrete sensor element, the second discrete sensor element, and the third discrete sensor element of the first sensor row occupy a different region of the first sensor row;
a second sensor row overlying said display and extending along said first direction, said second sensor row having a first discrete sensor element, a second discrete sensor element, and a third discrete sensor element, wherein each of the first discrete sensor element, the second discrete sensor element, and the third discrete sensor element of the second sensor row occupy a different region of the second sensor row, the first and second sensor rows being a transparent conductive material deposited and etched on a surface of a first substrate;
a first sensor column overlying said display and extending along a second direction said first sensor column having a first discrete sensor element and a second discrete sensor element;
a second sensor column overlying said display and extending along said second direction, said second sensor column having a first discrete sensor element and a second discrete sensor element, the first and second sensor columns being a transparent conductive material deposited and etched on a surface of a second, different substrate, the first substrate and the second substrate bonded to one another in a stacked relation such that a bottom surface of the first substrate having sensor rows formed thereon is bonded to a top surface of the second substrate with an adhesive disposed therebetween and the bottom surface of the second substrate having sensor columns formed thereon is bonded to a top surface of a graphical display device; and
a first signal line electrically coupling a first one of said plurality channels of said controller to said discrete sensor elements of said first sensor row.

24. A capacitive touch system comprising:
a controller having a plurality of channels;
a first sensor row extending along a first direction, said first sensor row having a first discrete sensor element, a second discrete sensor element, and a third discrete sensor element, wherein each of the first discrete sensor element, the second discrete sensor element, and the third discrete sensor element of the first sensor row occupy a different region of the first sensor row;
a second sensor row extending along said first direction, said second sensor row having a first discrete sensor element, a second discrete sensor element, and a third discrete sensor element, wherein each of the first discrete sensor element, the second discrete sensor element, and the third discrete sensor element of the second sensor row occupy a different region of the second sensor row, the first and second sensor rows being a transparent conductive material deposited and etched on a surface of a first substrate;
a first sensor column extending along a second direction, said first sensor column having a first discrete sensor element and a second discrete sensor element; and
a second sensor column extending along said second direction, said second sensor column having a first discrete sensor element and a second discrete sensor element, the first and second sensor columns being a transparent conductive material deposited and etched on a surface of a second, different substrate, the first substrate and the second substrate bonded to one another in a stacked relation such that a bottom surface of the first substrate having sensor rows formed thereon is bonded to a top surface of the second substrate with an adhesive disposed therebetween and the bottom surface of the second substrate having sensor columns formed thereon is bonded to a top surface of a graphical display device,
wherein a first one of said plurality channels of said controller is coupled to said discrete sensor elements of said first sensor row.

* * * * *